United States Patent [19]

Tatem, Jr. et al.

[11] 3,779,665

[45] Dec. 18, 1973

[54] COMBINED VARIABLE ANGLE STATOR AND WINDMILL CONTROL SYSTEM

[75] Inventors: Bemis Caldwell Tatem, Jr.; John Theodore Moehring, both of Cincinnati, Ohio

[73] Assignee: General Electric Company, Lynn, Mass.

[22] Filed: Sept. 22, 1972

[21] Appl. No.: 291,250

[52] U.S. Cl................. 415/123, 415/149, 415/150, 137/601
[51] Int. Cl. ... F01d 21/00, F01d 21/02, F01d 17/00
[58] Field of Search................... 415/149, 150, 123; 137/601

[56] References Cited
UNITED STATES PATENTS 3,227,176   1/1966   Luebering et al................ 415/123
3,458,118   7/1969   Burge et al. ....................... 415/149
3,487,992   1/1970   Pineda............................. 415/149

*Primary Examiner*—Henry F. Raduazo
*Attorney*—Edward S. Roman et al.

[57] ABSTRACT

A gas turbine engine is provided with a combined variable angle stator and windmill brake control system for simultaneous variation of the angles of a multiplicity of stages of variable compressor stator vanes together with independent means for closing off the airflow through the aft most row of variable stator vanes to brake windmilling of the engine in the event that the engine should become inoperative.

5 Claims, 6 Drawing Figures

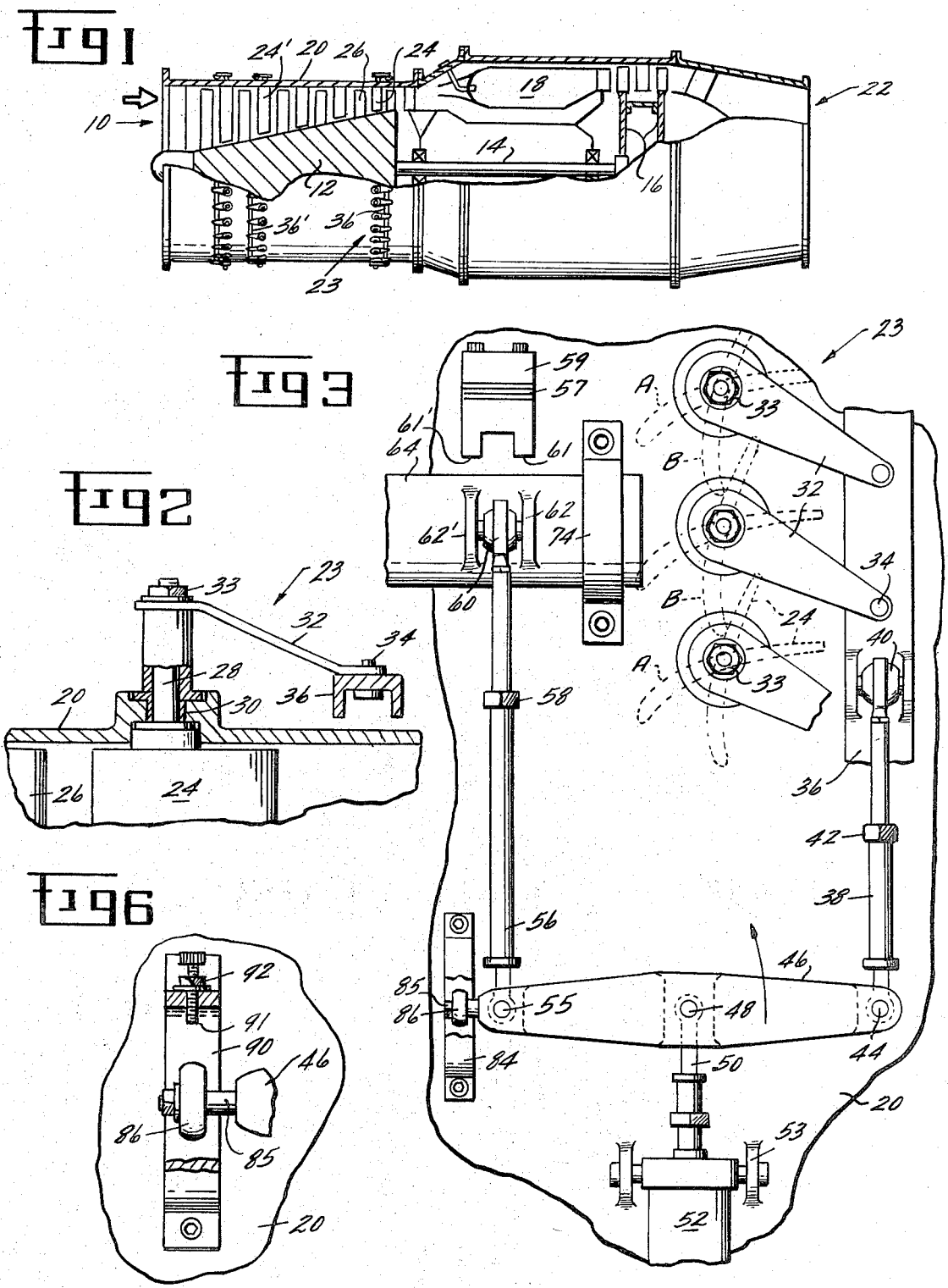

COMBINED VARIABLE ANGLE STATOR AND WINDMILL CONTROL SYSTEM

The invention described and claimed herein resulted from work done under United States Government contract FA-55-66-6. The United States Government has an irrevocable, non-exclusive license to practice and have practiced the invention claimed herein, including the unlimited right to sublicense others to practice and have practiced the claimed invention for any purpose whatsoever.

BACKGROUND OF THE INVENTION

This invention relates generally to a combined variable angle stator and windmill brake control system for a gas turbine engine and, more particularly, to a combined variable angle stator and windmill brake control system wherein the aft most row of variable compressor stator vanes may be closed off to block engine windmill during an engine shutdown or malfunction at high rotative speeds, and such windmill brake operates independently of the variable angle stator actuating means.

The related problems of reliability and safety for advanced high Mach military aircraft and supersonic commercial jet transports scheduled for use in the near future will become more acute. It has, therefore, become necessary to place added stress on reliability of the aircraft, engines, and related systems. For reasons of passenger and crew member safety and mission accomplishment in high Mach aircraft utilizing advanced high performance turbojet type engines, it will be essential that such an aircraft be able to continue to perform its flight mission with one or perhaps more of its engines non-operative.

Obviously, a certain point can be reached in any multi-engine installation when enough of the power plants would become non-operative to prevent the continuation of flight. Assuming, however, that flight is still possible, one of the primary problems is these multi-engine high speed aircraft utilizing turbojet or turbofan engines, i.e., any engine which has rotating components such as compressor and power turbine bladed rotors mounted on a shaft, concerns the high rotative speed of the shaft caused by the force of air entering the engine inlet. To further explain, if a gas turbine engine becomes non-operative at a high Mach number because of failure of one of the many accessory, fuel system, or lubrication system components, for example, the supersonic velocity of the air produces an extremely high total pressure at the inlet of the engine which will be combined with a low total pressure at the exit. When the high rotative speed of the non-operating engine, involving extremely large moments of rotating inertia, is coupled with a dearth of engine lubrication system heat sink (since there would no longer be fuel flowing to the non-operating engine and the heat sink or cooling medium for the lubrication fluid normally furnished by the fuel would not be available), inevitably the result is seizure of the rotor shaft bearings. An abrupt seizure could produce an undesirable and even dangerous condition in the aircraft or vehicle by reason of the engine mounting structure or engine nacelle suffering severe structural damage during the sudden and violent deceleration of the rotating components. In the case of a supersonic commercial transport, or even a military bomber, it will be vital that the aircraft continue to maintain altitude and speed using the remaining engines. That the problem is particularly acute in aircraft designed to fly at Mach 2.5 and above will be realized when it is understood that if the fuel is cut off, a non-operative turbojet engine can windmill up to 93 percent of full speed.

The solution to the problem of windmilling is further complicated by the fact that in the design of aircraft capable of these high speeds, the problem of weight is critical. Thus, it has been found that proposals for use of inlet duct closure means, such as flaps, or compressor variable inlet guide vanes, have had to be abandoned as impractical since these structures of necessity must be relatively massive and heavy to withstand the air blast. Another suggested solution involving reverse turbine rotor blade air impingement during windmilling to brake the rotor has also proved to be less than desirable due to the inefficiency occasioned by the unfavorable curvature of the typical turbine blade airfoil.

When a number of spaced apart rows of stator vanes are varied simultaneously as is generally the case for supersonic gas turbine engines, it is then possible to simultaneously close off all the variable stator vanes in order to brake engine windmilling. However, it is both unnecessary and unwieldy that the entire mass of variable stator vanes be closed off to brake engine windmilling. In order to close off a row of stator vanes, it is necessary that the row be made variable through an inordinately wide range of positions. However, if all the rows of stator vanes are made variable through such a wide range of positions, then compressor performance becomes unduly compromised. Also, should the actuator or control for varying the stator vanes become disabled, there would be no means to brake engine windmill.

One particularly advantageous scheme conventionally employed for windmill braking is disclosed in U.S. Pat. No. 3,227,176 to Leubering et al. The lighter and more compact mechanism of Leubering et al utilizes an additional row of small variable stator vanes located at the rear of the compressor for a windmill brake. The flow annulus at the rear of the compressor is considerably smaller in cross-sectional area and, therefore, easier to close down. The disadvantage to the system is disclosed by Leubering et al is that an additional stage of variable stator vanes must be provided to act solely as a windmill brake during engine shutdown. This additional stage of variable stator vanes would be used only infrequently during inflight engine shutdowns, and consequently imposes a weight and complexity penalty to the engine during normal operation.

Accordingly, it is a primary object of this invention to provide a combined variable angle stator and windmill brake control system for a gas turbine engine wherein the windmill brake may be operated independently of the variable angle stator control.

It is also an object of this invention to provide a combined variable angle stator and windmill brake control system for a gas turbine engine of the type having a number of spaced rows of variable compressor stator vanes which may be varied simultaneously wherein the system further includes means for closing off the aft most row of variable stator vanes independently of the other rows of variable stator vanes.

SUMMARY OF THE INVENTION

A turbojet engine includes a combined variable angle stator and windmill brake control system for adjustng a row of variable compressor stator vanes. A driving member connects to the row of variable stator vanes for adjusting the angle of the vanes. A differential bellcrank is connected to the driving member by means of a link which rotatably connects to one end of the bellcrank. A windmill brake actuating means is provided for connection to the differential bellcrank at a point intermediate the ends thereof, so as to provide a substantially fixed point about which the differential bellcrank may pivot for variation of the angle of the stator vanes during normal engine operation. A variable stator actuating means connects to the other end of the differential bellcrank to provide rotation of the differential bellcrank about the pivot point, thereby moving both the connecting link and driving member in order to vary the angle of the stator vanes. Actuation of the windmill brake means operates to move the differential bellcrank from its pivot point and drive the variable stator vanes into the closed position so as to block the flow therethrough and brake engine windmilling.

DESCRIPTION OF THE DRAWINGS

While the specification concludes with a series of claims which particularly point out and distinctly claim the subject matter which Applicants regard as their invention, an understanding of this invention may be gained from the following detailed description of a preferred embodiment, which is given in light of the accompanying drawings, in which:

FIG. 1 is a side view partly in cross-section of a typical aircraft gas turbine engine including the combined variable angle stator and windmill brake control system of this invention.

FIG. 2 is an enlarged partial cross-sectional view of a portion of the mechanism used to rotate a stator vane about its axis.

FIG. 3 is an enlarged partial plan view of the combined variable angle stator and windmill brake control system of this invention.

FIG. 6 is a partial cross-sectional view along the line 6—6 of FIG. 5.

DESCRIPTION OF THE PREFERRED EMBODIMENT

Figure 4:
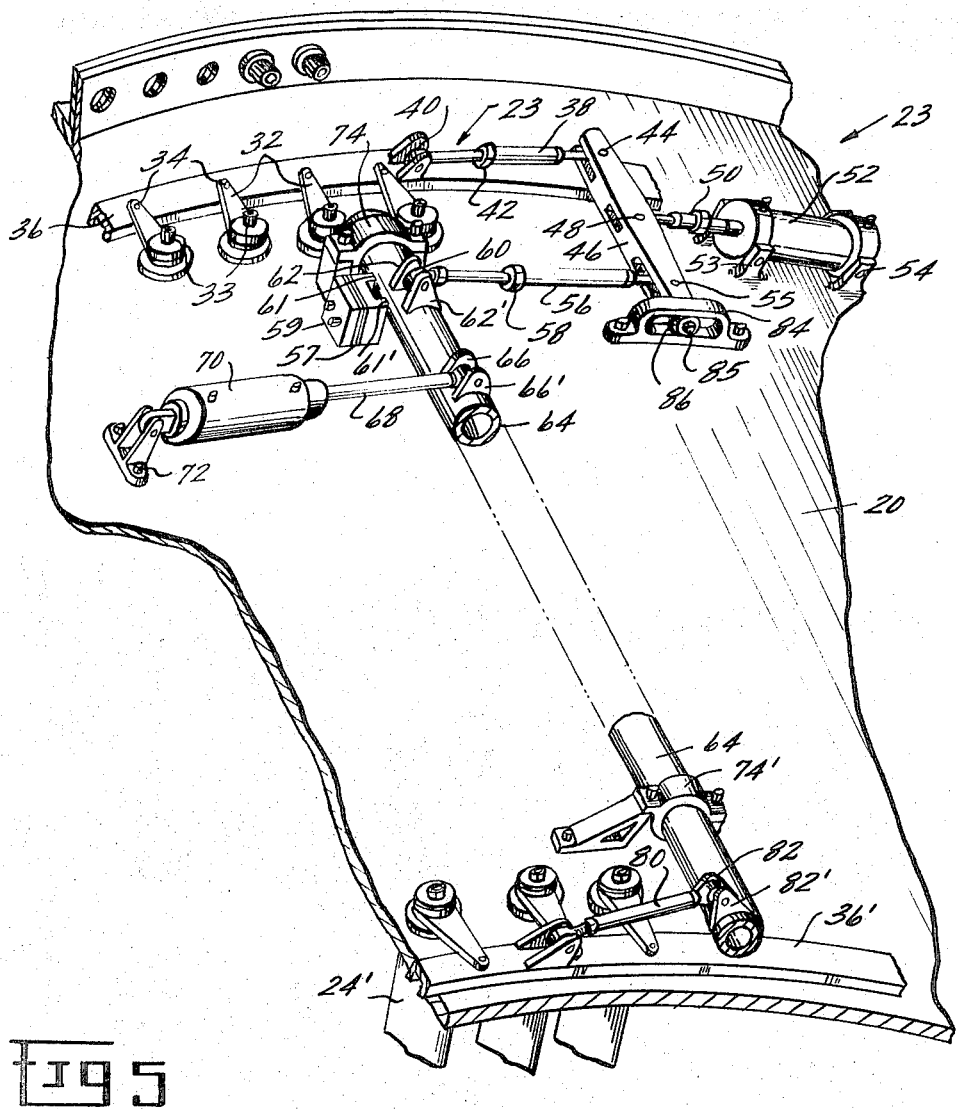
FIG. 4 is a partial perspective view of the combined variable angle stator and windmill brake control system of this invention.

Referring to FIG. 1, there is shown a typical turbojet engine having an inlet end indicated generally at 10. The engine includes a compressor rotor 12 mounted on a central shaft 14. The shaft 14 also supports a turbine rotor 16 furnishing the driving force for the compressor rotor. The turbine rotor may be single, double or more staged rotors. Intermediate the compressor and turbine rotors are means for providing combustion in the engine such as an annular liner which is indicated at 18. The engine components are surrounded in the usual manner by an outer casing 20 providing a duct through which air flows in the direction of the large arrow in FIG. 1. After combustion takes place, the hot gas stream exits through an engine exhaust nozzle, indicated generally at 22. In the disclosed embodiment, the combined variable angle stator and windmill brake control system is shown generally at 23 as including a row of variable stator vanes 24 at the rear of the compressor. The stator vanes, as is conventional, are located adjacent a row of compressor rotor blades indicated at 26.

As shown in the enlarged view of FIG. 2, each variable stator vane 24 includes a trunion 28 projecting outwardly through an opening 30 in the casing 20. Linkage means for rotating the adjustable stator vanes includes a lever arm 32 secured at one end of the trunion, the other end of the arm being connected by suitable means such as pin 34, to a circumferentially extending actuator ring 36. The actuator ring is adapted to be moved in a rotary direction with respect to the engine and preferably comprises a pair of so-called half rings suitably joined. For conventional turbojet engines, axially spaced apart rows of variable stator vanes, together with their associated actuator rings, are simultaneously actuated by means to be made obvious from the following discussion.

Referring now to FIGS. 3 and 4, the combination variable angle stator and windmill brake actuating system 23 of this invention is shown in greater detail. Movement of the actuator ring 36 in a rotary direction is achieved through a ring actuator link 38, one end of which is rotatably pinned to the actuator ring by the uniball bearing shown generally at 40. The length of the ring actuator link 38 may be varied through adjusting bolt 42. The other end of link 38 is rotatably pinned at 44 to a differential bellcrank 46. Intermediate the opposing ends of the differential bellcrank 46, a pin is included at 48 for rotatably pinning the end of a linear output member 50 which extends from a windmill brake actuator 52. The windmill brake actuator 52 may be affixed to the engine casing 20 by spaced apart flanges shown generally at 43 and 54 in FIG. 4.

The other end of the differential bellcrank 46 is extended as a shaft 85 upon which is rotatably fixed a roller 86 which moves within the track of a guide 84 such that the differential bellcrank 46 is free to pivot about the axis of pin 48, but is constrained against rotation about the axis of the linear output member 50 by the guide 84 and the roller 86.

The differential bellcrank 46 is rotatably pinned at 55 to a bellcrank actuator link 56 wherein the length of the bellcrank actuator link 56 may also be varied through an adjusting bolt 58. A uniball bearing 60 rotatably connects the other end of the bellcrank actuator link 56 between the outer ends of two spaced apart crank arms 62, 62' which extend radially outward from a torque tube 64. The torque tube 64 is journalled for rotation with respect to the engine casing by longitudinally spaced apart bearings 74 and 74'. The broken away portion of the torque tube 64 may extend substantially the axial length of the compressor with a plurality of bearings not shown rotatably engaging the torque tube at longitudinally spaced apart intervals.

Counter clockwise rotation of the torque tube 64 as viewed from the engine inlet is limited by an adjustable stop 59 which is fixedly attached to the outer engine casing 20. Adjustable stop 59 includes two laterally extending arms 61 and 61' which respectively engage the crank arms 62, 62' upon counter clockwise rotation of the torque tube 64. The relative spacing between the arms 61, 61' and cranks 62, 62' determines the extent of counter clockwise rotation allowed the torque tube, and this spacing may be varied by the addition or removal of shims 57.

Rotation of the torque tube 64 relative to the engine casing 20 is provided by means of a torque tube actuator 70 which is rotatably affixed to the engine casing by means of the clevis arrangement shown generally at 72. The torque tube actuator 70 includes a linear output member 68 which rotatably connects between the ends of two spaced apart crank arms 66, 66' extending radially outward from the torque tube.

A typical gas turbine engine, as illustrated in FIG. 1, generally includes a control system (not shown) which is responsive to various parameters such as speed, temperature and pressure. During normal engine operation, the control may receive a signal indicating the position of the stator vanes should be changed for the particular running conditions. When a change in speed, temperature or pressure is sensed such as to require rotation of the stator vanes, the control system transmits a signal to the actuator 70 which transmits linear motion to the linear output member 68. The torque tube actuator may be of any type well known to the art and may be either pneumatically, hydraulically, or electrically operated. As should be readily obvious from the drawings, linear motion of the linear output member 68 operates to rotate the spaced apart crank arms 66, 66' about the axis of the torque tube, thereby rotating the torque tube. Rotation of the torque tube transmits, through spaced apart crank arms 62, 62', linear motion to the bellcrank actuator link 56. During normal engine operation, linear output member 50 of the windmill brake actuator 52 remains stationary providing a fixed pivot point 48 about which the differential bellcrank 46 may rotate. Therefore, linear motion of the bellcrank actuator link 56 operates to pivot the differential bellcrank 46 about the pin 48. Rotation of the bellcrank 46 transmits linear motion to the ring actuator link 38 which acts to rotate the circumferentially extending actuator ring 36 about the engine casing, thereby simultaneously rotating the entire row of lever arms 32 and their associated stator vanes 24.

For the conventional turbojet engine as shown in FIG. 1, it is not only desirable that the last row of stator vanes 24 be made variable, but it is also preferred that other more forward rows of stator vanes be made simultaneously variable with the last row of vanes 24. This may be accomplished by longitudinally spacing apart actuator links, one of which is shown at 80 along the forward portion of the torque tube. Such links may be rotatably connected to the torque tube by means of crank arms 82, 82' which extend radially from the torque tube in a manner such that rotation of the torque tube linearly translates the actuating link 80. The other end of actuating link 80 is connected to an actuator ring 36' which is one of a plurality of longitudinally spaced apart actuator rings (not shown). Each actuator ring is connected to simultaneously vary the angle of an individual row of stator vanes 24' by a mechanism similar to that shown for variable stator vanes 24.

The torque tube arrangement described herein is a conventional means for simultaneously varying a multiplicity of stator vanes and it is to be understood that other conventional means for varying stator vanes could also be utilized without departing from the scope of invention.

A windmill brake system must be provided, as previously discussed, to drive the variable stator vanes 24 to the completely closed position during flight in the event of a serious malfunction or sudden complete loss of power in one or more of the engines of a multi-engine installation. In such event, the malfunctioning engine can be prevented from windmilling to destruction by completely blocking off the duct formed at the aft end of the compressor rotor 12. The high speeds of the rotor shaft which would result from allowing the engine to freely turn during supersonic velocities would inevitably result in sudden seizure of the main rotor shaft supporting the compressor and turbine rotors which would prove potentially disastrous either to the engine or the aircraft. As previously referenced in U.S. Pat. No. 3,227,176 to Leubering et al., it is of particular advantage to eliminate the complex heavy inlet guide vanes or inlet duct flaps conventionally employed for windmill braking. The lighter and more compact mechanism of Leubering et al utilizes the smaller stator vane located at the rear of the compressor for a windmill brake where the flow annulus is considerably smaller in cross-sectional area and, of course, easier to close down. The system of Leubering et al., however, is limited in that an additional stage of varible stator vanes must be provided to act solely as a windmill brake during engine shutdown, and whereas the additional stage is used only infrequently during engine shutdown, it imposes a weight and complexity penalty to the engine during normal operation.

Therefore, the combined variable angle stator and windmill brake control system of this invention includes a separate windmill brake actuator 52 for closing off only the last row of variable stator vanes 24 independently of the position of the torque tube actuator. Should a failure occur in the variable stator vane control system or in the torque tube actuator, means still exist for closing off the last row of variable stator vanes in order to brake windmilling of the engine.

If it should be desirable to shut down an engine because of a sudden loss of power, the aircraft operator would manually apply a signal to operate the windmill brake actuator 52. This will cause the member 50 to move linearly out of the actuator 52, translating the differential bellcrank 46 and its associated actuator link 56. Translation of link 56 in turn operates to rotate the torque tube 64 in the counter clockwise direction against the stop 59, fully opening all the rows of variable stator vanes. As is readily apparent, member 68 must be able to retract into actuator 70 for the torque tube to rotate counter clockwise. To this end, the actuator 70 and its control incorporate means to relieve the actuating power of a normally functioning stator system when the windmill brake is operated after engine shutdown. This permits the member 68 to be retracted into actuator 70 through the influence of actuator 52.

Although the system has been described in relation to fully opening all of the rows of variable stator vanes, it is to be understood that the system may also be designed to close or nearly close all of the rows of variable stator vanes before the last row of vanes is fully closed. For this purpose the orientation of the windmill brake actuator and its associated linkages need only be reversed in order to rotate the torque tube clockwise into the closed position against the stop.

Linear translation of the linear member 50 after the torque tube has been rotated to the full counter clockwise position operates to rotate the differential bellcrank 46 about a point of pivot at 55. As can be most readily seen from FIG. 3, the uniball bearing 60 permits limited lateral rotation of the bellcrank actuator link 56 as is required to accommodate rotation of the differential bellcrank in the direction shown by the arrow. Therefore, although pin 55 laterally rotates a limited distance about the uniball bearing 60, it still provides a substantially fixed pivot about which the differential bellcrank 46 rotates upon operation of the windmill brake actuator 52. Rotation of the differential bellcrank 46 about the substantially fixed pivot point 55 operates to rotate the actuator ring 36 so as to simultaneously turn the lever arms 32 about the trunions 28 rotating the variable stator vanes 24 counter clockwise into the closed position as shown by the phantom lines B. In an alternate embodiment, the lever arms 32 could extend forwardly with the actuator ring 36 disposed on the forward side of the stator vanes 24 such that rotation of the actuator ring 36 would operate to rotate the stator vanes 24 clockwise into the closed position. Of prime significance for both embodiments is the fact that the last row of variable stator vanes 24 may be rotated into the windmill brake position independently of the other rows of variable stator vanes.

Figure 5:
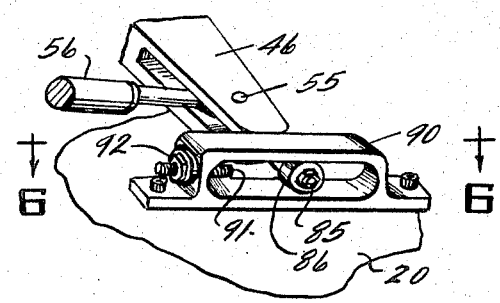
FIG. 5 is a partial perspective view of an alternate arrangement for part of the combined variable angle stator and windmill brake control system of this invention.

Referring to FIGS. 5 and 6 there is shown an alternate embodiment whereby the adjustable stop 59, shims 57, and laterally extending arms 61 and 61' may be replaced by a travel limiting guide 90, an adjustable stop screw 91 and a stop locking nut 92. Upon application by the aircraft operator of a signal to operate the windmill brake, linear member 50, bellcrank 46 and link 56 all begin to translate in unison. Torque tube 64 is thereby rotated in the counter clockwise direction until roller 86 engages the adjustable stop screw 91. At this point, all the rows of variable stator vanes are fully open. Continued linear translation of the member 50 after the torque tube has been rotated to nearly the full counter clockwise position operates to rotate the differential bellcrank 46 about a point of pivot at the contact point between roller 86 and stop 91. As can be seen from FIGS. 5 and 6, the roller 86 within guide 90 and in contact with the stop screw 91 permits slight lateral movement of the contact point as is required to accommodate rotation of the differential bellcrank in the direction shown by the arrow. Therefore, although the contact point between the roller and stop screw may travel slightly in a lateral direction, there is still provided a substantially fixed pivot point about which the differential bellcrank 46 may rotate upon operation of the windmill brake actuator 52 so as to permit rotation of the variable stator vanes 24 counter clockwise into the closed position as shown by the phantom lines B.

While the preceding detailed description of our combined variable angle stator and windmill brake control system is shown as utilizing a conventional single shaft turbojet engine for purposes of illustration, it will be understood that any gas turbine engine having two or more compressor and turbine rotors respectively may equally benefit from the teachings of this invention. Our disclosed windmill control system is designed to meet a critical high Mach, multi-engined aircraft requirement, namely, the ability to block flow through the compressor for a safe shutdown of a malfunctioning engine while maintaining high supersonic flight speeds with the remaining engines. The latching and linking means of the present invention insures against accidental closing down of an engine until such time as the aircraft operator himself desires to energize the system, and once energized, that the stator will remain in the closed position independently of the variable angle stator control.

Having thus described one embodiment of the invention what is desired to be secured by Letters Patent is as follows:

1. In a turbojet engine having a row of variable compressor stator vanes, a combined variable angle stator and windmill brake control system comprises:
   a driving member connected to a row of variable stator vanes for adjusting the angle of the vanes;
   a first link member, one end of which connects to the driving member;
   a differential bellcrank, one end of which rotatably connects to the other end of the first link member;
   a windmill brake actuating means connecting the differential bellcrank at a point intermediate the ends thereof, so as to provide a point about which the differential bellcrank may pivot for variation of the angle of the stator vanes during normal engine operation;
   a variable stator actuating means connecting the other end of the differential bellcrank to provide rotation of the differential bellcrank about the pivot point thereby moving both the first link member and driving member in order to vary the angle of the stator vanes, wherein actuation of the windmill brake means operates to move the differential bell-crank from its pivot point and drive the variable stator vanes into the closed position so as to block the flow therethrough and brake engine windmilling.

2. The combined variable angle stator and windmill brake control system of claim 1 including at least two longitudinally spaced rows of variable stator vanes, each connected to a respective driving member and moved by the variable stator actuating means wherein one of the rows of variable stator vanes is adjusted through movement of the differential bellcrank and first link member and actuation of the windmill brake actuator means operates to close off only that row of variable stator vanes adjusted through the differential bell-crank and first arm.

3. The combined variable angle stator and windmill brake control system of claim 2 including:
   a guide in fixed connection to the turbojet engine and having a track therein for receipt of a roller, rotatably fixed to that end of the differential bellcrank which connects to the variable stator actuating means wherein the track includes adjustable means therein for limiting the distance travelled by the roller within the track.

4. The combined variable angle stator and windmill brake control system of claim 2 wherein the variable stator actuating means includes:
   a torque tube rotatably connected to the engine casing;
   a second link member connecting between a point on the torque tube radially outward from the center axis thereof and a point at the other end of the differential bellcrank such that rotation of the torque tube imparts substantially linear motion to the second link in turn rotating the differential bellcrank about the pivot point to adjust the angle of one row of variable stator vanes;
   third link members connecting other points on the torque tube radially outward from the center axis thereof to respective driving members such that rotation of the torque tube imparts substantially linear motion to the third links, in turn moving the respective driving members so as to adjust the other variable angle stator vanes; and an actuator connected to the engine casing and including an output member connecting to a point on the torque tube radially outward from the center axis thereof, such that linear movement of the output member operates to rotate the torque tube.

5. The combined variable angle stator and windmill brake control system of claim 2 including:

a torque tube rotatably connected to the engine casing and including a plurality of spaced apart crank arms extending radially outward from the surface thereof;

a stop member in fixed connection to the engine casing for limiting rotation of the torque tube;

a second link member connecting a crank arm to the other end of the differential bellcrank such that rotation of the torque tube imparts substantially linear motion to the second link in turn rotating the differential bellcrank about the pivot point to adjust the angle of the aft most row of variable stator vanes;

third link members connecting the other crank arms to respective driving members such that rotation of the torque tube imparts substantially linear motion to the third links, in turn moving the respective driving members so as to adjust the variable angle stator vanes;

the variable stator actuator means connected to the engine casing and having an output member connecting to a crank arm from the torque tube such that linear movement of the output member operates to rotate the crank arm and torque tube; and the windmill brake actuator means connected to the engine casing and having a second output member connecting to a point intermediate the ends of the differential bellcrank wherein actuation of the windmill brake means operates initially to linearly move the windmill brake output member, differential bellcrank, and second link member so as to rotate the torque tube against the stop member and open the stator vanes, and wherein continued movement of the windmill brake output member then operates to rotate the differential bellcrank about the point of connection to the second link member and move the first link member and its associated driving member to close off the aft most row of variable stator vanes.

* * * * *